United States Patent [19]
Carbonnel et al.

[15] 3,674,728
[45] July 4, 1972

[54] ION EXCHANGE RESINS

[72] Inventors: Jack V. Carbonnel; Paul D. Grammont, both of Chauny, France; Louis E. Werette, Bruxelles, Belgium

[73] Assignee: Diamond Shamrock Corporation, Cleveland, Ohio

[22] Filed: April 30, 1970

[21] Appl. No.: 33,512

Related U.S. Application Data

[63] Continuation-in-part of Ser. No. 698,692, Jan. 18, 1968, abandoned.

[30] Foreign Application Priority Data

Jan. 30, 1967 France.................................6792937

[52] U.S. Cl.....................260/2.2 R, 260/2.1 E, 260/80.7, 260/80.78
[51] Int. Cl..................................................C08f 15/40
[58] Field of Search.....................260/2.1 E, 2.2, 80.78

[56] References Cited

UNITED STATES PATENTS

| | | | |
|---|---|---|---|
| 2,864,776 | 12/1958 | Tsunoda et al. | 260/2.1 |
| 2,885,371 | 5/1959 | Tavani et al. | 260/2.2 |
| 2,891,014 | 6/1959 | Tsunoda et al. | 260/2.2 |
| 2,891,015 | 6/1959 | Tsunoda et al. | 260/2.2 |
| 3,427,262 | 2/1969 | Corte et al. | 260/2.2 |
| 3,544,488 | 12/1970 | Corte et al. | 260/2.2 |

FOREIGN PATENTS OR APPLICATIONS

| | | |
|---|---|---|
| 3,892 | 5/1958 | Japan |
| 5,740 | 7/1958 | Japan |
| 14,012 | 1961 | Japan |
| 5,741 | 1958 | Japan |

*Primary Examiner*—Melvin Goldstein
*Attorney*—Roy Davis, C. Thomas Cross, Timothy E. Tinkler, John J. Freer, Neal T. Levin, Leslie G. Nunn, Jr., Helen P. Brush and John C. Tiernan

[57] ABSTRACT

Through the use of a combination of cross-linking agents it is possible to obtain a polymer structure capable of being converted into an ion-exchange resin having improved properties. This combination of cross-linking agents comprises two compounds, one aliphatic and one aromatic, each of which has at least two double bonds.

1 Claim, No Drawings

ION EXCHANGE RESINS

REFERENCE TO A COPENDING APPLICATION

This application is a continuation-in-part of our copending application Ser. No. 698,692, filed Jan. 18, 1968 now abandoned.

BACKGROUND OF THE INVENTION

This invention relates in general to the manufacture of ion-exchange resins, both anionic and cationic.

It is well known to form an ion-exchange resin using divinylbenzene alone as the cross-linking agent. While these resins have advantageous properties, including improved resistance to oxidation, certain difficulties have also been noted. Most importantly, because of the rigidity of the bond formed using divinylbenzene as a cross-linking agent, the ultimate ion-exchange resin has shown poor resistance to the expansion and contraction which occurs during the service cycle of the resin.

It has been proposed, for example in U. S. Patent No. 2,645,621, that a monovinyl aromatic compound be copolymerized with an aliphatic compound having a number of double bonds. Experience has shown, however, that the cationic sulfonated resins obtained from such a copolymer are quite fragile.

In order to produce a cation-exchange resin having carboxylic acid groupings, a copolymer of acrylonitrile and divinylbenzene has been proposed. Unfortunately however, it has once again been found that this resin has little resistance to breakage when passing from the regenerated to the exhausted form. In order to overcome this disadvantage the use of certain vinyl esters has been proposed. While improvements are obtained, the results are still not entirely satisfactory.

It has also been proposed to provide a completely cross-linked, water-insoluble, ion-exchange resin, especially one containing carboxylic acid groups, by copolymerizing an ester of acrylic acid with a combination of cross-linking agents, both aliphatic and aromatic. Such resins, however, are expensive and have a poor resistance to osmotic shock.

SUMMARY OF THE INVENTION

Therefore it is an object of this invention to overcome the above-mentioned disadvantages and to provide an ion-exchange resin which will pass from the regenerated to the exhausted form without undergoing cracking or breaking of the resin itself.

It has now been found that a water-insoluble ion-exchange resin is obtained by attaching anion or cation exchange groups to a polymer skeleton, which polymer skeleton consists of a copolymer of a monomer selected from the group consisting of acrylonitrile, styrene and methylene glutaronitrile and a combination of two-cross-linking agents, each of which has at least two double bonds, one of said cross-linking agents being aliphatic while the other is aromatic.

Ion-exchange resins such as described above have elastic properties not possessed by corresponding ion-exchange resins made from a polymer skeleton containing only one cross-linking agent, e.g., divinylbenzene. The resins of this invention are extremely durable, are resistant to osmotic shock and show relatively little tendency to expand and contract when passing from the regenerated to the exhausted form and back. These resins also exhibit improved exchange rates. Other characteristics and advantages of the invention will appear during the description which follows.

DESCRIPTION OF THE PREFERRED EMBODIMENTS

In order to form the polymer skeleton of the present invention, a monomer selected from the group consisting of acrylonitrile, styrene and methylene glutaronitrile is copolymerized by a conventional suspension copolymerization technique, with a combination of two cross-linking agents, each containing at least two double bonds, one agent being aliphatic and the other aromatic. The aliphatic cross-linking agents useful, which also include the cycloaliphatic cross-linking agents, are: 1,3-butadiene, isoprene; piperylene; chloroprene; 2,3-dimethyl-1,3-butadiene; 2,3-pentadiene; 1,4-pentadiene; 1,5-hexadiene, 2,4-hexadiene; 2,5-dimethyl-2,4-hexadiene; octadiene; 3,7-dimethyl-2,4-octadiene; 2 methyl-6-methylene-2,7 octadiene; 1,3-decadiene; 1,3,5-hexatriene; hexachlorocyclopentadiene; cyclopentadiene and dicyclopentadiene. Divinyl and trivinylbenzene are the aromatic cross-linking agents which are useful.

Following the above polymerization, the polymer skeleton, which, since obtained by a suspension polymerization process will be in the form of beads, is converted to the desired ion-exchange resin. This is done by any of the methods well known to those skilled in the art of ion-exchange resin production and by these known means either an anionic or cationic exchange resin may be obtained. It will be understood that, depending upon the method used to form the ultimate ion-exchange resin and the identity of the monomer chosen, resins which are either strong or weak cation exchangers or strong or weak anion exchangers may be provided.

It will be apparent to one skilled in the art that the properties of the ultimate exchange resin may be varied somewhat by changing the weight ratio of aromatic to aliphatic cross-linking agent. Furthermore, the total amount of cross-linking agents which are present in combination with the monomer may vary over wide limits depending upon the results desired. Thus the amount of cross-linking agents present may vary within the range of from 0.1 to 50 percent by weight of the total polymerizable mixture.

In order that those skilled in the art may more completely understand the invention, the following illustrative examples are afforded.

EXAMPLE 1

For the polymerization reaction, into a 500 cc. flask, provided with a stirrer, cooling means and a thermometer, are placed 220 cc. of saturated brine and a commercial dispersion agent. There is then added with stirring a mixture containing 79.5 grams of acrylonitrile, 19.5 grams of divinylbenzene (DVB, 62 percent by weight), 1 gram of isoprene and 1.2 grams of benzoyl peroxide (85 percent by weight). Polymerization is conducted for 7 hours at a temperature between 55° and 60° C. following which the polymer beads are filtered, washed and dried.

In order to convert the polymer skeleton into a weak-acid cation-exchange resin, 20 grams of the polymer beads are placed in a flask together with 150 cc. of 60% $H_2SO_4$ and refluxed between 137° and 140° C. for 7 hours. The resin so obtained has a total capacity of 4.7 equivalents per liter in the hydrogen from, 2.68 equivalents per liter in the sodium form and 8.3 equivalents per kilogram in the sodium form.

EXAMPLE 2

Following the procedure of Example 1, a mixture is polymerized which mixture comprises 78.5 grams of acrylonitrile, 19.5 grams of DVB (62 percent), 2 grams of isoprene and 1.2 grams of benzoyl peroxide (85 percent). After hydrolysis, also as in Example 1, there is obtained a cation-exchange resin having a total capacity of 4.41 equivalents per liter in the hydrogen form, 2.88 equivalents per liter in the sodium form and 7.78 equivalents per kilogram in the sodium form.

EXAMPLE 3

Following the procedure of Example 1, a mixture of 79.7 grams of acrylonitrile, 16.3 grams of DVB (61.2 percent, 4 grams of isoprene and 1.2 grams of benzoyl peroxide (85 percent) is polymerized for 7 hours at a temperature between 40° and 60° C.

The polymer beads obtained by this process are then converted to a weak-acid cation exchange resin by hydrolysis of 20 grams of the polymerized beads in 150 cc. of $H_2SO_4$ (60 percent) under the conditions described in Example 1. This resin has a total capacity of 4.9 equivalents per liter in the hydrogen form, 3.3 equivalents per liter in the sodium form and 8.06 equivalents per kilogram in the sodium form.

EXAMPLE 4

The procedure of Example 3 is followed exactly with the exception that the acrylonitrile is replaced with a molar equivalent amount, 129 grams, of methyl acrylate. In this instance the weak-acid cation-exchange resin so formed has a total capacity of 4.7 equivalent per liter in the hydrogen form, 2.98 in the sodium form and 7.85 equivalent per kilogram in the sodium form. Further, the resin swells 90 percent in volume when passing from the H+ to the Na+ form, as opposed to only 48.5 percent for the resin of Example 3. Moreover, it is found that placing the resin of this example in the H+ form, into a 1N solution of NaOH, results in 50 percent of the beads having a size greater than 0.5 millimeters, most of the resin being of this size, being broken, evidencing their poor resistance to osmotic shock. Substantially none of the beads of the resin of Example 3 are broken under identical conditions.

EXAMPLE 5

Using the apparatus of Example 1, a polymerization suspension medium is prepared comprising 250 cc. of water and 1.25 grams of poly(vinyl alcohol). There is then added with agitation a mixture comprising 102 cc. of styrene, 0.15 cc. DVB (61 percent), 1 gram of isoprene and 1 gram of benzoyl peroxide. Polymerization is conducted for 8 hours at a temperature between 70° and 85° C. and then for 1 hour at 88° C., following which the polymer beads are filtered, washed and finally dried in an oven at 70° C.

These polymer beads are then chloromethylated and subsequently aminated with trimethylamine. By this means there is obtained an anion-exchange resin having a total capacity of 1.2 equivalents per liter in the chloride form and 3.34 equivalents per kilogram in the chloride form.

EXAMPLE 6

Using the apparatus of Example 1 there is added to a dispersing medium as in Example 5 a mixture of 116 grams of styrene, 17.7 grams of DVB (61 percent), 1.35 grams of isoprene and 0.3 gram benzoyl peroxide. This mixture is polymerized at 85°—86° C. for 8 hours following which it is filtered, washed and dried.

The polymer beads obtained are then sulfonated, using 1 part of polymer beads to 7 parts, by weight, of $H_2SO_4$(98 percent), over a period of 8 hours. The strong-acid cation-exchange resin obtained by this means has a total capacity of 2.02 equivalents per liter in the sodium form and 4.72 equivalents per kilogram in the sodium form.

EXAMPLE 7

Following the procedure of Example 6, a mixture comprising 112 grams of styrene, 17.7 grams DVB (61 percent), 5.4 grams of isoprene and 0.4 gram benzoyl peroxide is polymerized. The polymer beads so obtained are sulfonated, also by the procedure described in Example 6, and are found to have a total capacity of 1.77 equivalents per liter in the sodium form and 4.44 equivalents per kilogram in the sodium form.

EXAMPLE 8

Following the procedure of Example 1, a mixture of 80.5 gram of acrylonitrile, 19.5 DVB (62 percent) and 1.2 grams of benzoyl peroxide (82 percent) is polymerized. Upon hydrolysis the polymer beads are found to have a total capacity of 4.59 equivalents per liter in hydrogen form, 2.51 equivalents per liter in the sodium form and 8.76 equivalents per kilogram in the sodium form. It is found that these ion-exchange resin beads in the hydrogen form, i.e., the regenerated form, break when placed in contact with a 1 N solution of NaOH. This example therefore illustrates the advantage of using a combination of cross-linking agents in the polymerization process.

EXAMPLE 9

Operating as in Example 1 but at a temperature of 40°–60° C. for a period of 7 hours, a mixture comprising 83.7 grams of acrylonitrile, 16.3 grams of DVB (61.2 percent) and 1.2 grams benzoyl peroxide (82 percent) is polymerized. Following hydrolysis these ion-exchange resin beads are found to have a total capacity of 3.43 equivalents per liter in the hydrogen form, 1.08 equivalents per liter in the sodium form and 8.7 equivalents per kilogram in the sodium form. As in Example 8, however, it is found that when these beads, in the hydrogen form, are placed in contact with a NaOH solution, they break.

EXAMPLE 10

To illustrate the use of isoprene alone as the cross-linking agent, the procedure of Example 1 is followed using a mixture comprising 98 grams of acrylonitrile, 2 grams of isoprene and 2.8 grams of benzoyl peroxide (85 percent). The resultant polymer beads are hydrolyzed in order to produce a weak-acid cation-exchange resin having a total capacity of 1.32 equivalents per liter in the hydrogen form, 0.196 equivalent per liter in the sodium form and 10.5 equivalents per kilogram in the sodium form. While these resin beads in the hydrogen form do not break when contacted with a NaOH solution, it is found that they are extremely fragile and moreover that they swell enormously during the service cycle. When placed under a microscope the resin beads are noted to be spongy in appearance with approximately 14 percent of the beads being completely hollow. Beads prepared using a combination of aromatic and aliphatic cross-linking agents do not have this appearance nor does excessive swelling occur when operating under the same conditions.

EXAMPLE 11

As a further example of the use of only an aliphatic cross-linking agent, a mixture of 96 grams acrylonitrile, 4 grams of isoprene and 2.8 grams of benzoyl peroxide (85 percent) is polymerized according to the process of Example 1. After hydrolysis the cation-exchange resin formed is found to have a total capacity of 2.45 equivalents per liter in the hydrogen form, 0.7 equivalent per liter in the sodium form and 10.2 equivalents per kilogram in the sodium form. Once again, while the resin beads do not break in contact with the NaOH solution, they are found to be quite fragile and to swell excessively.

EXAMPLE 12

Using the dispersing medium of Example 6 and the apparatus of Example 1, a mixture of 92 grams of styrene, 8 grams of isoprene and 2.5 grams of benzoyl peroxide is polymerized at a temperature of 85° to 86° C. for 15 hours.

The resin beads so obtained, after washing and drying, are placed in contact with a 95 percent solution of $H_2SO_4$. However, when it is attempted to sulfonate these beads at a temperature of 120° C., it is found that they dissolve.

EXAMPLE 13

In order to illustrate the use of an aliphatic cross-linking agent other than isoprene, the following mixture is polymerized according to the process of Example 1; 87.7 grams of acrylonitrile, 6.5 grams of DVB (61.2 percent), 5.8 grams of cyclopentadiene and 1.2 grams of benzoyl peroxide (85 percent). Upon hydrolysis a weak-acid cation-exchange resin is obtained which has a capacity of 1.98 equivalents per liter in the hydrogen form, 0.74 equivalent per liter in the sodium form and 9.13 equivalents per kilogram in the sodium form. When these resin beads in the hydrogen form are placed in contact with 1 N solution of NaOH they do not break.

EXAMPLE 14

In contrast to Example 13, a mixture containing 94.2 grams of acrylonitrile, 5.8 grams of cyclopentadiene and 1.2 grams of benzoyl peroxide is polymerized. When an attempt is made to convert the polymer beads to a weak-acid cation-exchange resin by hydrolysis in a 60 percent solution of $H_2SO_4$, however, it is found that the polymer beads, which were originally quite deformed, dissolve.

EXAMPLE 15

Using the dispersing medium and polymerization conditions of Example 5, 102 cc. of styrene, 0.753 gram of DVB (61.2 percent), 2.84 grams of hexachloropentadiene and 1 gram of benzoyl peroxide are polymerized to form the desired polymer skeleton. As in Example 5 the polymer beads are chloromethylated followed by amination with trimethylamine to form a strong-base anion-exchange resin having a capacity of 1.4 equivalents per liter in the chloride form and 3.84 equivalents per kilogram in the chloride form.

Using the attrition test described more completely in U.S. Pat. No. 3,418,262, which test comprises subjecting resin beads to mechanical wear under specified conditions for a certain period of time followed by measuring the amount of beads that are broken at the end of this test, it is found that the resin obtained as described in this example exhibits 6 percent attrition. By comparison, the anion-exchange resin obtained according to the practice of the present invention in Example 5, shows an attrition of only 1–2 percent.

The following table clearly illustrates the advantages obtained by the practice of the present invention through reference to certain of the preceding examples.

TABLE 6

| Example Number | Cross-linking agent (1 percent)[a] | | Volume of 20 gms. of beads (cm.³) | | Swelling[b] (percent) | Breakage[c] | Resistance to attrition |
| --- | --- | --- | --- | --- | --- | --- | --- |
| | DVB | Isoprene | Before hydrolysis | After hydrolysis | | | |
| 2 | 12 | 2 | 29 | 51.5 | 53 | None | Good. |
| 8 | 12 | 0 | 30 | 32 | 83 | Yes | Do. |
| 10 | 0 | 2 | 29 | 205 | 574 | None | Poor. |
| 3 | 10 | 4 | 28.2 | 49 | 48.5 | do | Good. |
| 9 | 10 | 0 | 30 | 43 | 218 | Yes | Do. |
| 11 | 0 | 4 | 27.7 | 136 | 250 | None | Poor. |
| | | Cyclopentadiene | | | | | |
| 13 | 4 | 5.8 | 31.5 | 65 | 167.5 | None | Good. |
| 14 | 0 | 5.8 | 49 | (¹) | | | |

[a] Weight percent of total polymerizable ingredients.
[b] During service cycle.
[c] When passing from the regenerated to the exhausted form.
¹ Dissolve.

Although the invention has been described with reference to certain specific embodiments thereof, it is not to be so limited since changes and alterations may be made therein which are within the full and intended scope of the invention, as defined in the appended claims.

We claim:

1. The weak-acid, cation-exchange resin obtained by hydrolysis of a copolymer of:
   a. acrylonitrile;
   b. an aromatic cross-linking agent selected from the group consisting of divinylbenzene and trivinylbenzene and,
   c. an aliphatic cross-linking agent selected from the group consisting of 1,3-butadiene; isoprene; piperylene; chloroprene; 2,3-dimethyl-1,3-butadiene; 2,3-pentadiene; 1,4-pentadiene; 2,4-hexadiene; 2,5-dimethyl-2,4-hexadiene; octadiene; 3,7-dimethyl-2,4-octadiene; 2-methyl-6-methylene-2,7-octadiene; 1,3-decadiene; 1,3,5-hexatriene; hexachlorocyclopentadiene; cyclopentadiene and dicyclopentadiene.

* * * * *

UNITED STATES PATENT AND TRADEMARK OFFICE
CERTIFICATE OF CORRECTION

PATENT NO. : 3,674,728
DATED : July 4, 1972
INVENTOR(S) : Jack Carbonnel et al.

It is certified that error appears in the above-identified patent and that said Letters Patent are hereby corrected as shown below:

Column 6, line 45, delete "octadiene;", first occurrence

Signed and Sealed this

Sixteenth Day of October 1979

[SEAL]

Attest:

RUTH C. MASON
Attesting Officer

LUTRELLE F. PARKER
Acting Commissioner of Patents and Trademarks